United States Patent [19]
Kao

[11] Patent Number: 5,870,734
[45] Date of Patent: Feb. 9, 1999

[54] THREE-DIMENSIONAL FILE SYSTEM USING A VIRTUAL NODE ARCHITECTURE

[75] Inventor: Ping-Hui Kao, Fort Collins, Colo.

[73] Assignee: Hewlett-Packard Company, Palo Alto, Calif.

[21] Appl. No.: 759,851

[22] Filed: Dec. 2, 1996

Related U.S. Application Data

[63] Continuation of Ser. No. 318,025, Oct. 4, 1994, abandoned.

[51] Int. Cl.⁶ .................................................. G06F 17/30
[52] U.S. Cl. .............................................. 707/2; 707/200
[58] Field of Search .................................... 707/1, 2, 200

[56] References Cited

U.S. PATENT DOCUMENTS

| | | | |
|---|---|---|---|
| 4,945,475 | 7/1990 | Bruffey et al. | 707/1 |
| 5,371,885 | 12/1994 | Letwin | 707/205 |
| 5,379,422 | 1/1995 | Antoshenkov | 707/1 |
| 5,454,101 | 9/1995 | Mackay et al. | 707/3 |
| 5,485,606 | 1/1996 | Midgdey et al. | 707/10 |
| 5,530,849 | 6/1996 | Hanushevsky et al. | 707/1 |

FOREIGN PATENT DOCUMENTS

0579368A1   1/1994   European Pat. Off. .

OTHER PUBLICATIONS

Korn et al., "A New Dimension for the Unix File System", Software Practice and Experience, vol. 20 (S1), pp. 19–34, Jun. 1990.

H.–C. Chung et al., "Design and Implementation of a Distributed File System" Software–Practice and Experience, vol. 21, No. 7, pp. 65–75, Jul. 1991.

A. Naiman, ed. The Macintosh Bible, 2/e, Goldstein & Blair, pp. 126–127, 292–293, 1989.

S. Quinlan, "A Cached WORM File System" Software–Practice and Experience, vol. 21, No. 12, pp. 1289–1299, Dec. 1991.

*Primary Examiner*—Thomas G. Black
*Assistant Examiner*—Jack M. Choules

[57] ABSTRACT

A file system uses a virtual node architecture to create a three-dimensional directory. A virtual node is created for each file and directory. Selected directory nodes can be linked together to create a stack. Only the top directory in each stack is normally accessible and appears to contain a union of all files and subdirectories contained in the stack. A look-up procedure is used to find a specified file or directory name by sequentially searching the stack beginning with the top directory node and returning the node corresponding to the first occurrence of the name encountered in the search. The virtual node architecture allows the present system to accommodate diverse file systems by permitting each node to designate an individual physical file storage system. The present system can also copy files and directory nodes contained in one stack node to another stack node for the purposes of file back-up or caching.

10 Claims, 7 Drawing Sheets

Fig. 7(a)
(Prior Art)
| Directory | Viewpath |
|---|---|
| /usr/bin | /n1/bin |
| /n1/bin/x | /n2/x |
| /n2/x | /n3/x |
| /n3/x | /n4/x |
Viewpath table
Fig. 7(b)
(Prior Art)
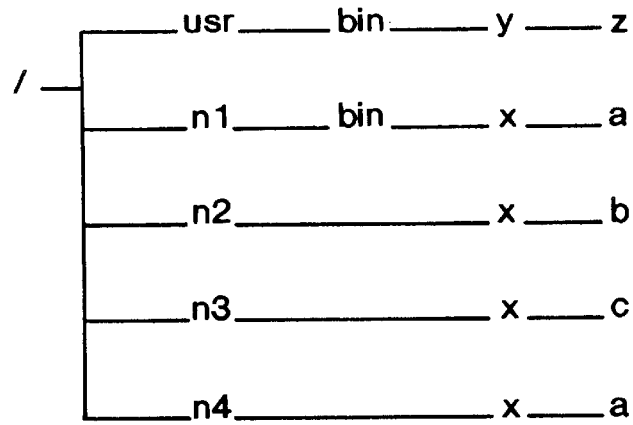
Fig. 8
(Prior Art)
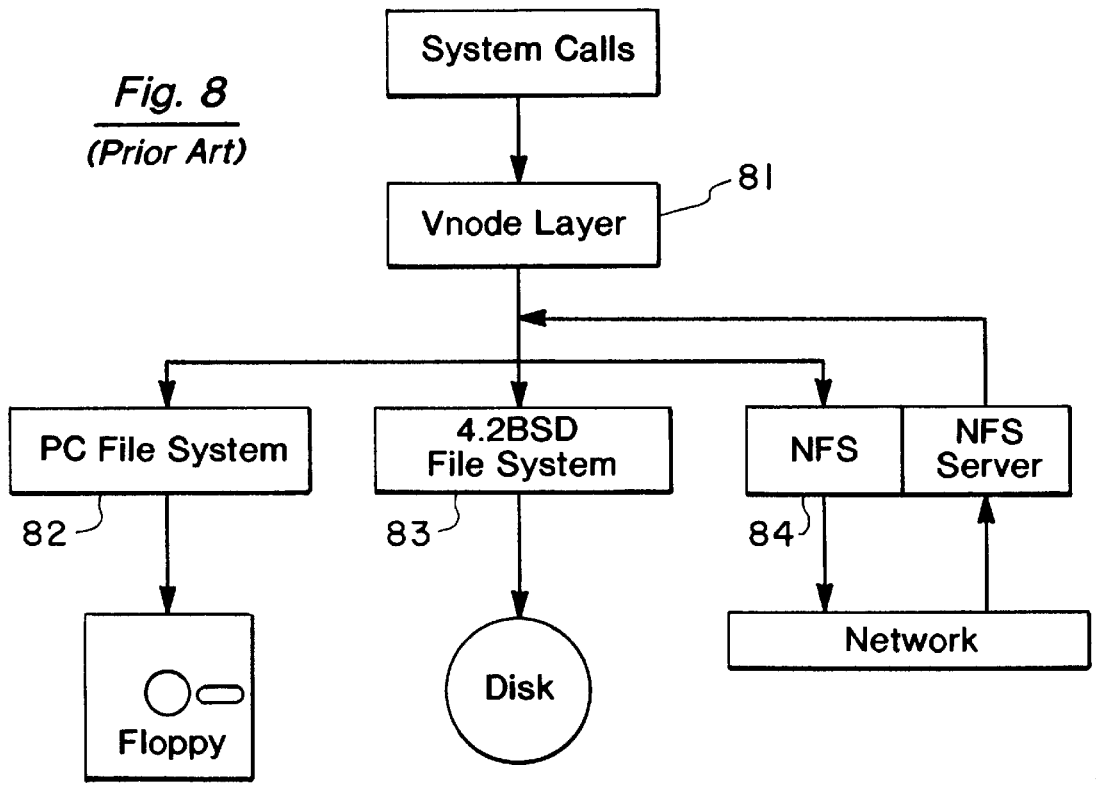

5,870,734

THREE-DIMENSIONAL FILE SYSTEM USING A VIRTUAL NODE ARCHITECTURE

CROSS REFERENCE TO RELATED APPLICATION

This is a continuation of application Ser. No. 08/318,025 filed on Oct. 4, 1994, now abandoned.

BACKGROUND OF THE INVENTION

1. Field of the Invention

The present invention relates generally to the field of computer file systems. More specifically, the present invention discloses a three-dimensional file system based on a virtual node (vnode) architecture.

2. Statement of the Problem

In a distributed computing environment, it is often desirable to share files among a number of users. Normally, sharing is accomplished by setting symbolic links (symlinks) to individual files or directories. Unfortunately, most file system layouts are not organized cleanly, and both sharable and un-sharable files are placed in the same directory. The result is to force the system administrator to set up symlinks at the file level. This requires hundreds or even thousands of symlinks in a typical system. Therefore, it is desirable to provide a three-dimensional file system that allows un-sharable (private) files and sharable files to be organized into different hierarchical levels to simplify system administration. This three-dimensional approach also greatly simplifies archival backups, re-mapping of file systems, and accommodation of diverse file storage devices.

Viewpathing is a concept used by many software development tools (e.g., nmake, build). A common problem faced by software development teams is source code control among members of the team. For example, one engineer may need to modify one portion of the source code while another engineer modifies another portion. It is not desirable for the two modifications to interfere with each other until the modifications are finalized and validated. One solution to address this problem is that each engineer makes their own copy of the source code for development. However, this solution often requires a huge amount of disk space. The viewpathing concept addresses this problem by allowing each user to search for files in different directories in the order specified by the VPATH variable in the user's environment. With the help of viewpathing, each user copies a few necessary files into their own working directory for modification. The viewpath is set so that the software development tools will first search the working directory for files and then search the common source directory tree for any remaining files.

A three-dimensional file system is disclosed by D. G. Korn et al., "The 3-D File System", *USENIX* 1989 *Summer Conference Proceedings,* pages 147–156, that extends the concept of viewpathing into the UNIX file system for the purpose of version control in development of multi-release software systems. In particular, Korn's file system enables one directory to be stacked or overlaid one on top of another directory. Any files in the lower-level directory, whose names are not in the top-level directory, appear as if they were part of the top-level directory. In other words, the top-level directory effectively becomes a union of itself and any lower-level directories.

The system described by Korn et al. is based on a viewpath table that is exported into the kernel process table. The kernel process keeps this table during the life of the process. The path name lookup operation (i.e., the operation to find a target file given a path name) searches the files according to the path name given. If a file is not found, the system continues the search in the remaining directories specified in the viewpath table. FIG. 7 illustrates an example of the Korn system. If a user attempts to open "usr/bin/x", the path name lookup operation first searches "/usr/bin". Since "usr/bin/x" does not exist, it looks into the viewpath table and finds that the viewpath for "/usr/bin" is "/n1/bin". The lookup operation continues the search in "/n1/bin" where it found "x". If the user wants "/usr/bin/x/c", the lookup operation first finds "x" (using the same sequence of steps described above) and looks into "/n2/x", then "/n3/x" where it finds "b". To access "a" in the "/n4/x/" directory from the "/usr/bin/x" directory, the user must use a special keyword " . . . " (for example, "ls . . . / . . . / . . . /a"). If the user requests creation of a file "/usr/bin/x/d", the operating system must first create a new directory "x" under "/usr/bin", change directory to the new directory "/usr/bin/x", and then create a new file "d" in that directory.

The system proposed by Korn et al. creates many problems. The UNIX kernel needs to keep a viewpath table for each process, and each viewpath table can be very large. The kernel also needs to remember the history of each path. For example, consider what must happen if the user changes directory to "/usr/bin/x" and creates a file "d". The kernel must remember that the history of the path is "/usr/bin/x", not "/n1/bin/x". This is not practical because the historical logs for each directory can be quite large and complex. Returning to this example, the kernel must first change the path back to "/usr/bin", create a directory "x", change to the new directory, and create the file "x". This creates a new problem in that the directory content is not consistent because directory "x" will appear to have changed. The original directory "x" contained file "a". Due to the fact that the new directory "/usr/bin/x" file is now the top level directory in the stack, directory "x" contains only file "d" and file "a" does not appear to exist. The inconsistent layout of the file system can cause application failures and also confuses users. Changing the current directory to " . . . " from a given directory could lead to any of several different directories depending on the selected viewpath. For example, changing directory to " . . . " from "/usr/bin/x" leads to "/usr/bin", while changing directory to " . . . " from "/n1/bin/x" leads to "/n1/bin", even though "/usr/bin/x" and "/n1/bin/x" could appear to the user as the same directory depending on the viewpath. This is clearly unacceptable.

The system proposed by Korn et al. only allows write operations to directories and files in the top level. All files and directories that are not in the top level can only be accessed on a read-only basis. In addition, files cannot be created or removed from lower-level directories. This creates a number of major problems, including inconsistent permission for files. For example, "/n1/bin/x/a" can be deleted, but "/usr/bin/x/a" cannot be deleted, even though both paths lead to the same file. Operations such as "rm*" will delete files in the top-level directory, but not files in the remainder of the viewpath. Similarly, commands such as "cp" (copy a file) will not perform the operation if the source file is the same name as the target file. The Korn system would require modification of these commands so that the operation is performed if the source file is in a viewpath directory and the target file is in the top-level directory. This not only breaks semantics, but also creates confusion for the user as to whether a file has actually been copied.

A virtual node (vnode) file system for UNIX is described by S. R. Kleiman, "Vnodes: An Architecture for Multiple File System Types in Sun UNIX", *USENIX* 1986 *Summer Conference Proceedings,* pages 238–247. This system is intended to allow easy implementation of multiple file system types within the UNIX kernel. Local, remote, and even non-UNIX file systems can be "plugged" into the UNIX kernel through a well defined interface, in much the same way that UNIX device drivers are added to the kernel. Traditional UNIX systems allowed only one type of file system. The Kleiman system creates a new "vnode" software layer 81 above each individual file system type 82, 83, and 84, as shown in FIG. 8. The file system dependent/independent split was done just above the UNIX kernel inode layer, since the inode is the main object for file manipulation in the kernel. The file system independent inode was renamed a virtual node, or "vnode." All file manipulation is done with a vnode object.

Similarly, file systems are manipulated through an object called a "vfs", or virtual file system. The vfs is the analog to the mount table entry in conventional UNIX systems. Each mounted vfs is linked to a list of mounted file systems. The first file system on the list is always the root, as shown in FIG. 9. The private data pointer (vfs_data) in the vfs points to file system dependent data. In the 4.2BSD file system 83, vfs_data point to a mount table entry.

When a mount system call is performed, the vnode for the mount point is looked up and the vfs_mount operation for the file system type is called. If this succeeds, the file system is linked into the list of mounted file systems and the "vfs_vnodecovered" field is set to point to the vnode for the mount point. This field is null in the root vfs. Once mounted, file systems are named by the path name of their mount points. Special device names are no longer used because remote file systems do not necessarily have a unique local device associated with them.

The public data fields in each vnode either contain data that is manipulated only by the vfs layer or data about the file that does not change over the life of the file, such as the file type (v_type). Each vnode contains a reference count (v_count) that is maintained by generic macros called to copy or destroy vnode pointers. When the last reference to a vnode is destroyed, the vn_inactive operation is called to tell the vnode's file system that there are no more references. The file system may then destroy the vnode or cache it for later use. The v_vfsp field in the vnode points to the vfs for the file system to which the vnode belongs. If a vnode is a mount point, the "v_vfsmountedhere" field points to the vfs for the file system. The private data pointer (v_data) in the vnode points to data that is dependent on the file system. In the 4.2BSD file system, v_data points to an in-core inode table entry.

FIG. 9 shows an example of vnode and vfs object interconnection. In FIG. 9, vnode1 is a file or directory in a 4.2BSD type file system. As such, its private data pointer points to an inode in the 4.2BSD file system's inode table. Vnode1 belongs to vfs1, which is the root vfs, since it is the first on the vfs list. Vfs1's private data pointer points to a mount table entry in the 4.2BSD file system's mount table. Vnode2 is a directory in vfs1, which the mount point for vfs2. Vfs2 is an NFS file system containing vnode3.

Path name traversal is done by a look-up routine, which takes a path name and returns a pointer to the vnode which the path represents. If the path name begins with a "/", the path name traversal starts at the root. Otherwise, it starts at the vnode pointed to by the current directory. The look-up operation traverses the path one component at a time using the vn_lookup operation. Vn_lookup takes a directory vnode and a specified component as arguments and returns a vnode representing that component. If a directory vnode has "v_vfsmountedhere" set, then it is a mount point. When a mount point is encountered going down the file system tree, the lookup operation follows the vnode's "v_vfsmountedhere" pointer to the mounted file system and calls the vfs_root operation to obtain the root vnode for the file system. Path name traversal then continues from this point. If a root vnode is encountered when following changing to a parent directory (i.e., " . . . "), the lookup operation follows the "vfs_vnodecovered" pointer in the vnode's associated vfs to obtain the covered node.

The path name traversal scheme implies that files on remote file systems appear as files within the normal UNIX file name space. Remote files are not named by any special constructs that current programs don't understand. The path name traversal process handles all indirection through mount points, as discussed above. This means that in a remote file system implementation, the client maintains its own mount points. If the client mounts another file system on a remote directory, the remote file system will never see references below the new mount point. Also, the remote file system will not see any " . . . " references at the root of the remote file system. For example, if the client has mounted a server's "/usr" on his "/usr" and a local file system on "/usr/local", then the path "/usr/local/bin" will access the local root, the remote "/usr", and the local "/usr/local" without the remote file system having any knowledge of the "/usr/local" mount point. Similarly, the path "/usr/ . . . " will access the local root, the remote "/usr" and the local root, without the remote file system (or the server) seeing the " . . . " out of "/usr".

Kleiman reports that his virtual node system has been in operation since 1984 and has been released as a product by Sun Microsystems. The system has been used to provide interfaces to the 4.2BSD file system 83, the Sun Network File System (NFS) 84, and an MS-DOS floppy disk file system 82.

3. Solution to the Problem

The present system provides a three-dimensional file system based on a virtual node architecture. Although the system disclosed by Korn et al provides a three-dimensional file system and Kleiman discusses a virtual node file system, none of the prior art references teach or suggest this combination to overcome the problems associated with Korn's three-dimensional file system as described above.

In particular, the present system allows sharable and un-sharable files to be separated in different levels of a stack of directories (a Z-stack). Typically, un-sharable files (i.e., private copies) are at the top of the Z-stack and directories containing sharable files are at the lower portion of the Z-stack. The Z-stack can also be used to organize files hierarchically on different storage devices by their frequency of use, so that rarely-used files are stored on slower devices and frequently-used files are stored on faster devices. Alternatively, this system allows files to be periodically copied to slower backup devices or WORM (write once, read many) devices at off-peak times. Finally, the present system can be employed to allow a user to temporarily install software for a trial period with permanently modifying the user's computer system.

SUMMARY OF THE INVENTION

This invention provides a file system using a virtual node architecture to create a three-dimensional directory. A virtual node is created for each file and directory. Selected directory nodes can be linked together to create a stack. Only the top directory in each stack is normally accessible and appears to contain a union of all files and subdirectories contained in the stack. A look-up procedure is used to find a specified file or directory name by sequentially searching the stack beginning with the top directory node and returning the node corresponding to the first occurrence of the name encountered in the search. The virtual node architecture allows the present system to accommodate diverse file systems by permitting each node to designate an individual physical file storage system. The present system can also copy files and directory nodes contained in one stack node to another stack node for the purposes of file back-up or caching.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIGS. 7(a) and 7(b) illustrate a viewpath table and a corresponding directory diagram, respectively, as an example of the three-dimension file system described by Korn et al.

FIG. 8 is a block diagram of the prior art virtual node architecture described by Kleiman.

DETAILED DESCRIPTION OF THE INVENTION

Figure 1:
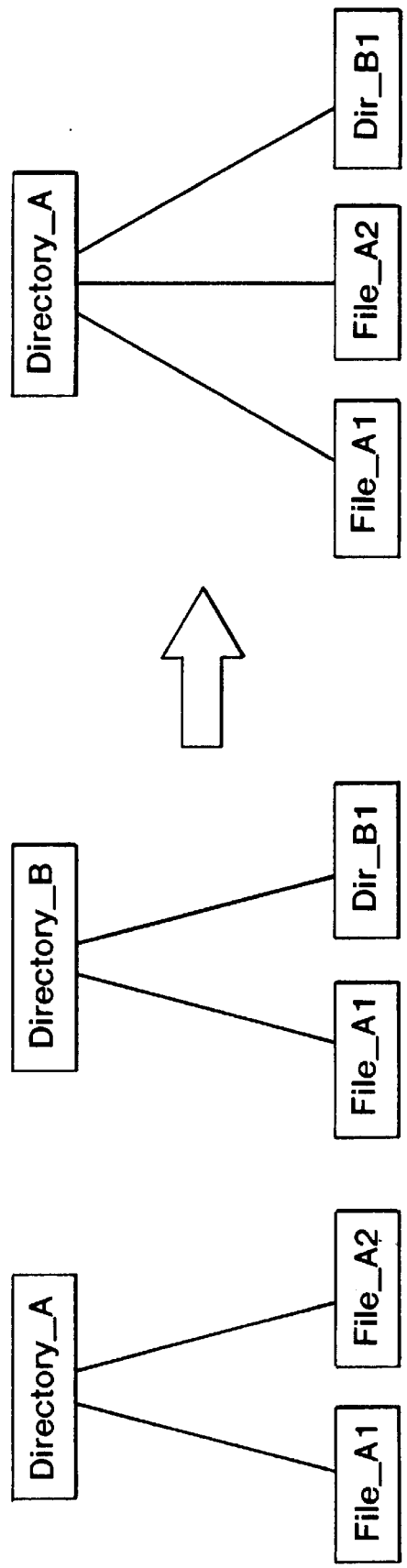
FIG. 1 is a block diagram showing an example of the manner in which the present system stacks directories and creates a union of the files contained therein.

Turning to FIG. 1, a simple example is provided illustrating the difference between a conventional two-dimensional file system and a three-dimensional file system. The left side of the figure shows two conventional directories A and B. Directory A contains two files A1 and A2, while directory B contains a file A1 and a subdirectory B1. The present system permits directories A and B to be stacked to form a Z-stack as shown on the right side of FIG. 1. In the resulting view, only the top directory (i.e., directory A) is normally visible to the user and any lower directories in the stack (i.e., directory B) are invisible. The top directory will appear to contain a union of the contents of all of the directories in the Z-stack. In this example, directory A appears to contain files A1 and A2 and subdirectory B1. File A1 under directory B is covered by file A1 in directory A, and cannot be accessed under normal circumstances. The closest analogy might be a stack of transparent sheets. Looking down from the top of the stack allows the viewer to see the union of all transparencies.

Returning to the previous example, note that directory B1, which as originally under directory B, is now under directory A. This directory can be accessed via the path "Directory_A/Dir_B1". If there were originally a directory B1 under directory A as well, the two Dir_B1's could be stacked together. In this case, files in both Dir_B1's would all appear in "Directory_A/Dir_B1". Alternatively, if the two Dir_B1's are not stacked, the one in directory B would be covered and all files and subdirectories contained in it would be inaccessible. Only the contents of the one in directory A could be accessed via the path "Directory_A/Dir_B1".

Figure 2:
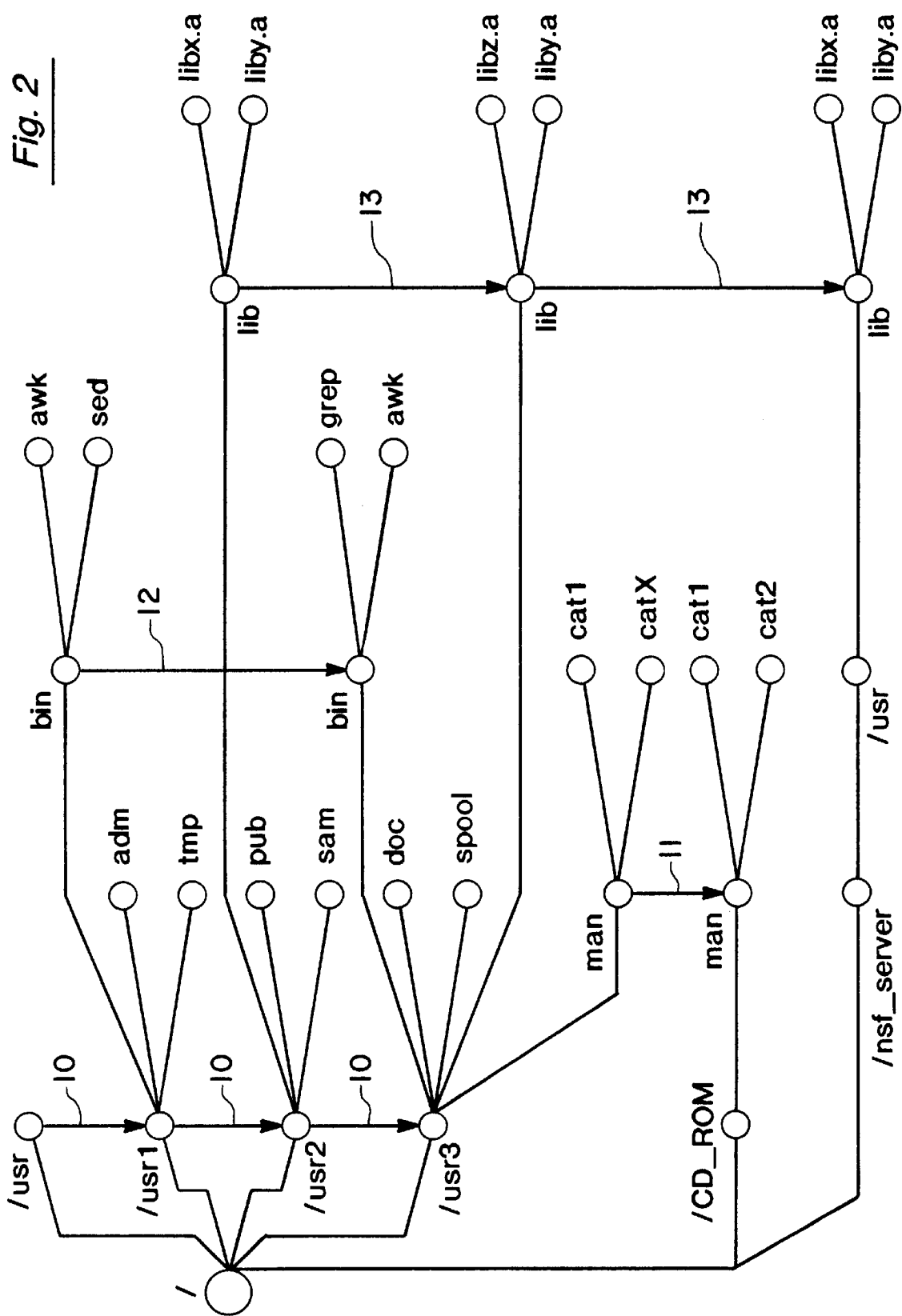
FIG. 2 is a block diagram showing another example of the manner in which directories can be stacked in the present invention.
Figure 3:
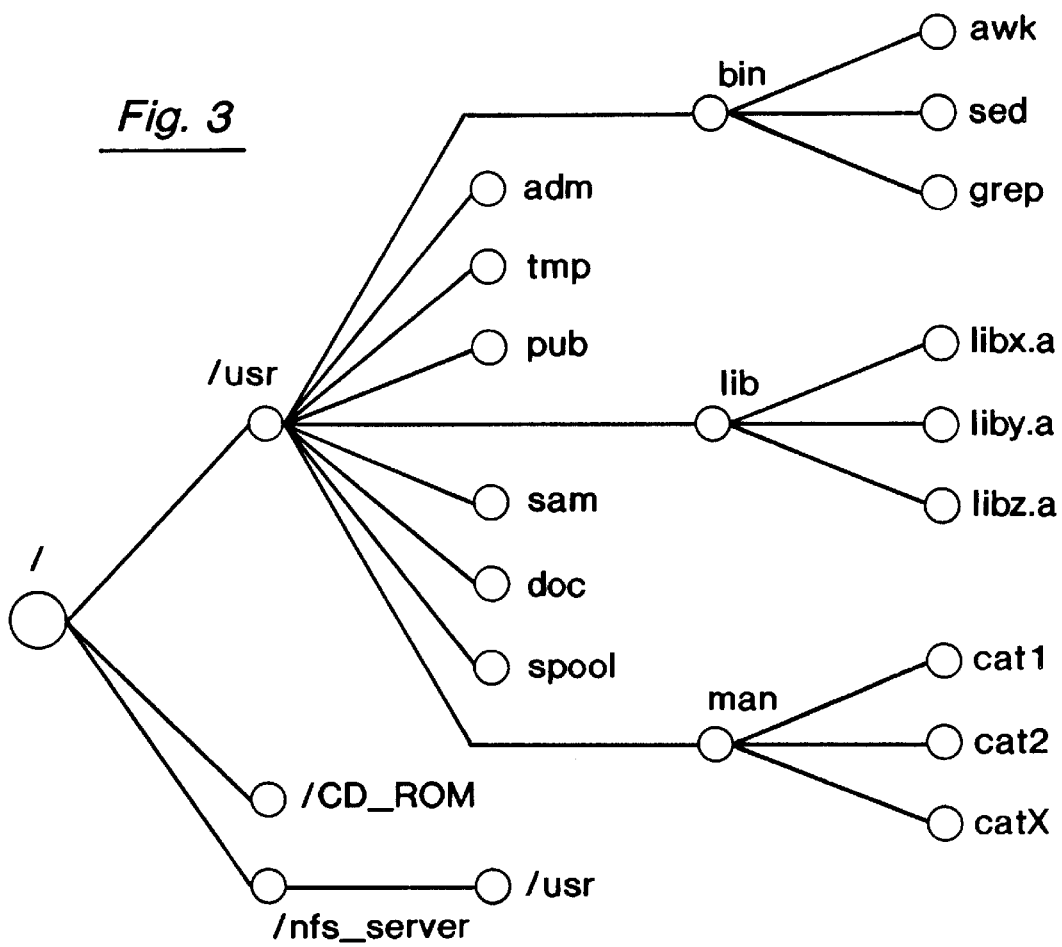
FIG. 3 is a block diagram corresponding to FIG. 2 showing the resulting directory structure as it would appear to a user.

Many Z-stacks can be set up to represent a rather complex file system, as illustrated in FIGS. 2 and 3. FIG. 2 is a more complicated example of a file system that includes several Z-stacks 10, 11, 12 and 13. FIG. 3 provides a corresponding user's view of the directory hierarchy shown in FIG. 2. When the user lists the files contained in "/usr", the following entries would appear: adm, tmp, pub, sam, doc, and spool. For "/usr/man", the entries would be cat1, catx, and cat2.

Figure 4:
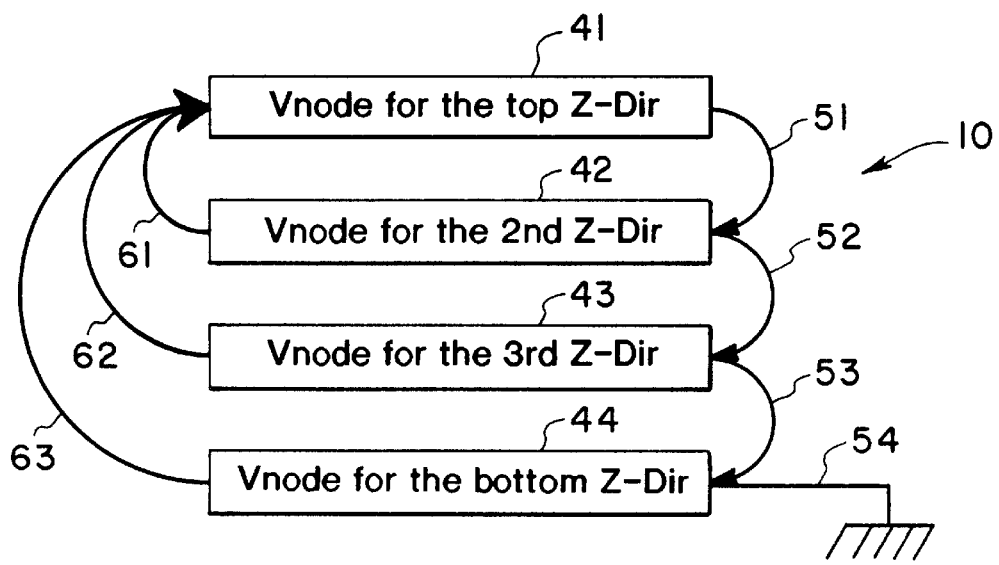
FIG. 4 is a block diagram of a Z-stack created by linking a series of directory vnodes.

Any directory or file in the present file system is represented by a vnode, in accordance with the virtual node architecture described by Kleiman. The Z-stack is constructed by linking (Z-links) the vnodes representing a preselected set of directories. The linking of vnodes is done through a special system call, normally when the system is booted-up. FIG. 4 shows the general linkage structure of a Z-stack 10. Each directory vnode 41–44 in the stack 10 includes a pointer or link 51–53 to the vnode underneath. The link 54 for the bottom directory 44 is a null. In addition, all directory vnodes in the stack include a pointer 61, 62, and 63 to the directory vnode 41 at the top of the stack 10.

A lookup procedure is used to access a file or directory in the system given a specified path name. The lookup procedure looks into the directory to see if the desired entry exists. If the entry exist, the system creates a vnode to represent the file/directory just found. Any further operation done to the target object is performed through the vnode. If the path name traverses a Z-stack, the lookup procedure starts at the top directory vnode in the stack to search for the desired entry. If found, a vnode is returned to the caller of the procedure. If the entry is not found, the system follows the pointer to the next lower directory vnode in the Z-stack and the continues the search there. This process is repeated until the entry is found or the bottom directory vnode in the Z-stack has been searched. The "getdirentries" system call is also modified in the present invention to report a union of all directory entries in a Z-stack, as previously discussed. User level programs such as "ls" (list) are similarly modified to accommodate Z-stacks.

Figure 5:
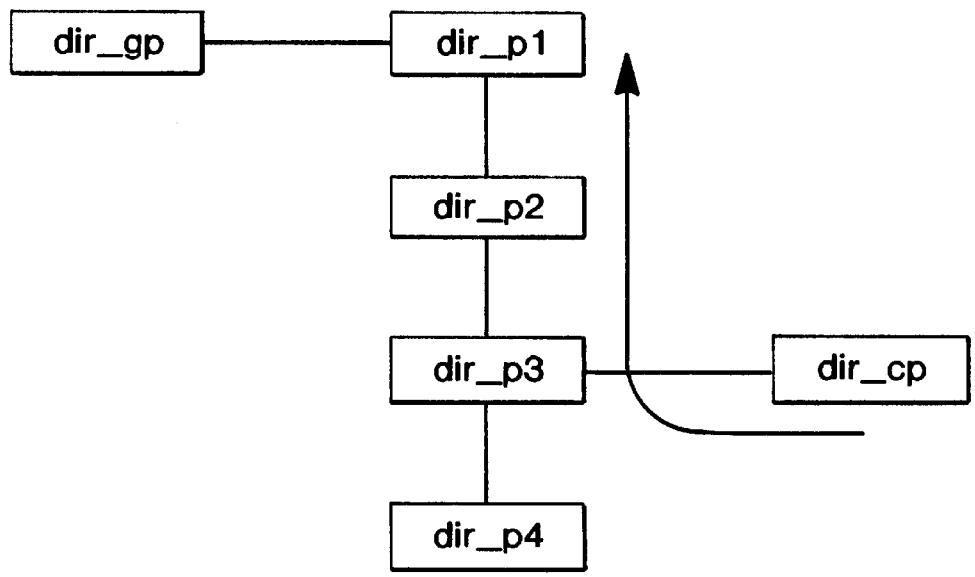
FIG. 5 is a block diagram showing an example of a Z-stack in which a change of current directory from dir_cp to its parent directory causes the current directory to be moved to the directory at the top of the stack (dir_p1) rather than dir_p3.

FIG. 5 illustrates a Z-stack 10 (dir_p1 through dir_p4) in which one of the directory vnodes contains a subdirectory (dir_cp). Assume the subdirectory dir_cp is the current directory. If the user changes to the parent directory (" . . . ") of dir_cp, the current directory is moved to the directory at the top of the Z-stack (i.e., dir_p1), even though the real parent directory of dir_cp is dir_p3. This is consistent with the general rule that the current directory stays at the top of the Z-stack.

Figure 6:
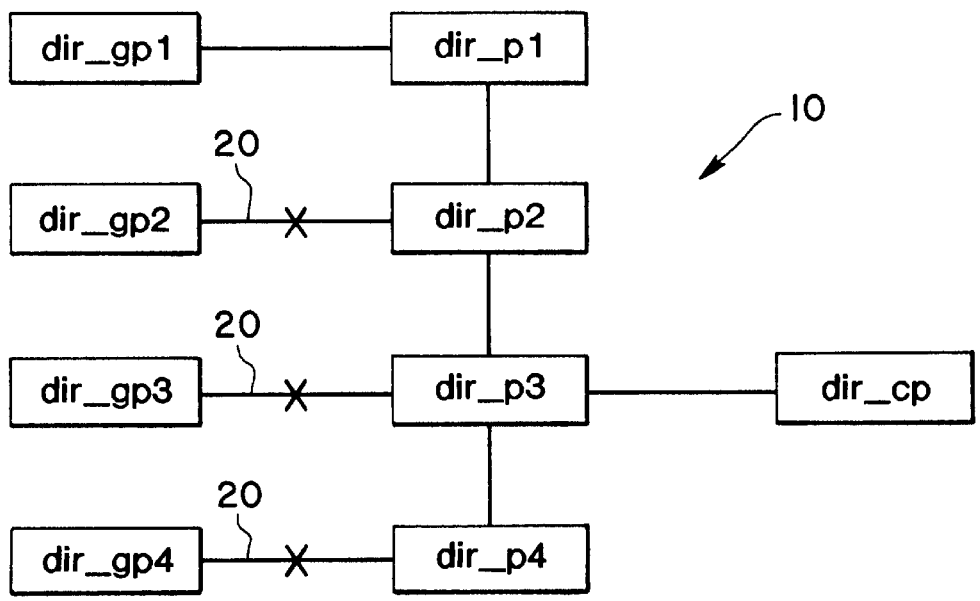
FIG. 6 is a block diagram showing an example of a Z-stack to illustrate that the paths through the original parent directories are blocked for lower level directories in the Z-stack.
Figure 9:
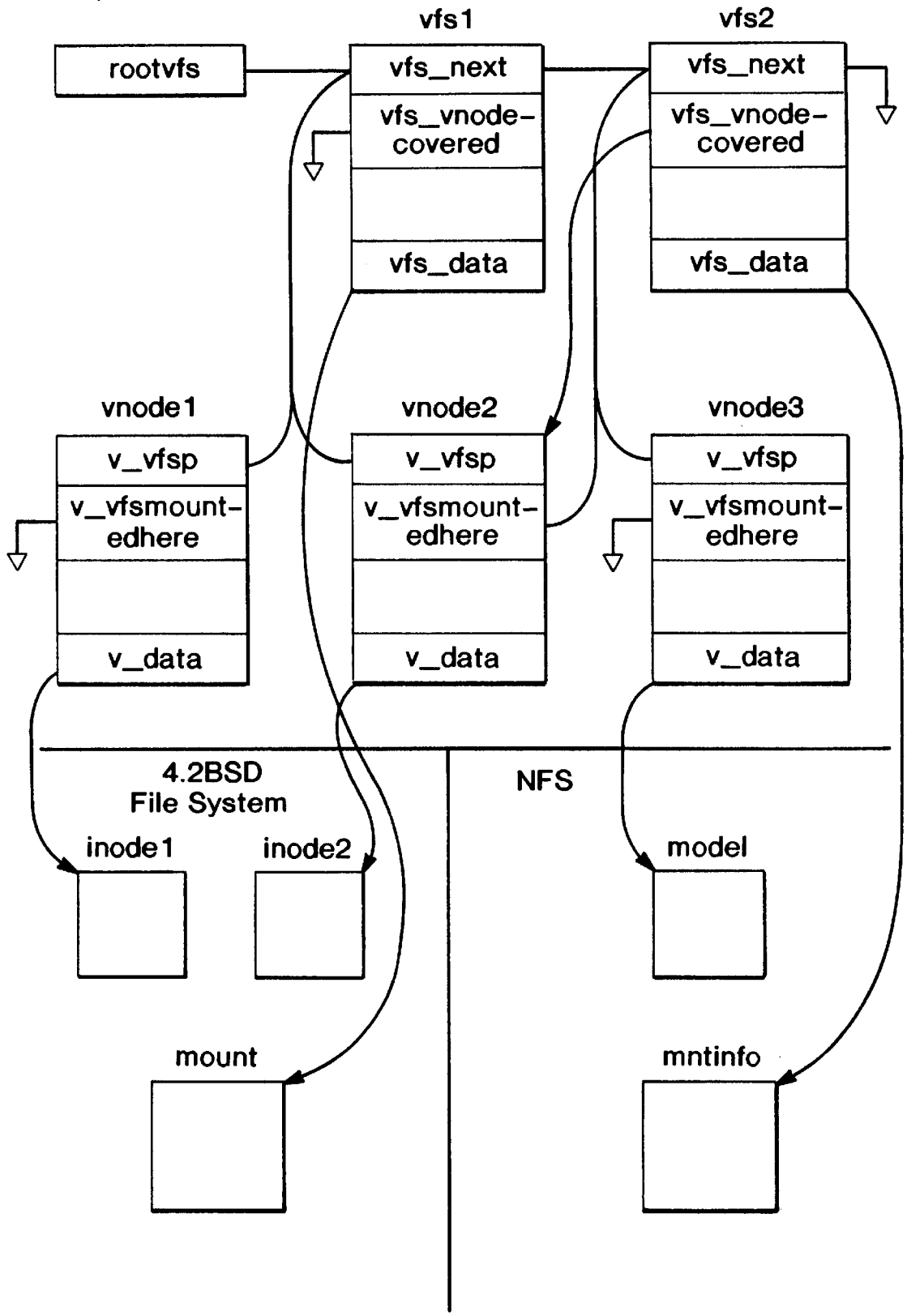
FIG. 9 is a schematic diagram showing an example of the prior art vnode layer object interconnection, as taught by Kleiman.

After a Z-stack has been created, the original paths are blocked between lower level vnodes in the stack and their original parent directories. As FIG. 6 illustrates, the original paths 20 between parent directories dir__gp2, dir__gp3, and dir__gp4 and their respective child directories dir__p2, dir__p3, and dir__p4 are blocked. In normal situations, any attempted access through these paths will fail. However, an escape mechanism is provided in the preferred embodiment of the present system. Any process in the system can ignore the Z-stack by setting a flag, Z-Blind. When this flag is set, the process sees the files and directories in the system in the conventional manner, as if the Z-stack did not exist. Any other processes that have not set the Z-Blind flag would still see the view provided by the Z-stack.

The present system also includes three other operations in addition to those previously discussed. The "Z-SetCreationZDir" operation is used to specify the directory in the stack (Z-Dir) where new files will be created. Each vnode in the Z-stack has a flag indicating whether new files may be created in the directory. At most, only one vnode in a Z-stack may have this flag set at any one time. If no flag set in any of the directories in a Z-stack, no file can be created in the Z-stack. The "Z-Beam__up" operation copies files in a specified directory at a lower level in a Z-stack to a specified directory at a higher level in the Z-stack. "Z-Beam__down" is the opposite operation. It copies files in a specified directory at a higher level in the Z-stack to a lower level directory in the Z-stack. The latter two operations can also be done by setting the Z-Blind flag and invoking the conventional copy operation between two directories in the Z-stack.

Figure 10:
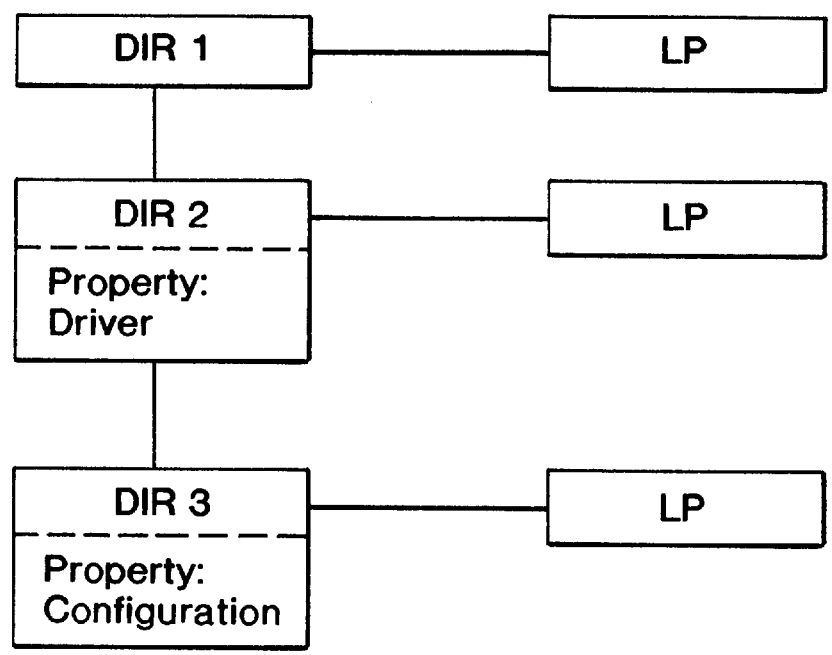

FIG. 10 is a schematic diagram of another example of the present system.

The present invention readily lends itself to use in many potential applications. As previously discussed, it is often desirable to share files among a number of users, particularly among member of a software development team. The present system allows un-sharable (private) files and sharable files to be organized into different hierarchical levels to simplify system administration. For example, un-sharable files can be placed in the top directory of a Z-stack and directories containing sharable files can be placed in the lower levels of the Z-stack.

The present system can also provide caching for slow file systems. A high-performance file system is placed at the top of the Z-stack, while file systems using slower devices are put in the lower Z-stack positions. Any write operations are therefore generally done to the faster device at the top of the Z-stack. Periodically, new versions of the files are copied down to a slower device at a lower level in the Z-stack using the Z-Beam__down operation.

Most UNIX systems have difficulty in writing to WORM (write once, read many) devices. The present system allows the WORM device to be mounted at a lower level in the Z-stack with a conventional read-write device at the top level. All write operations would normally be done to the read-write device by the UNIX kernel. However, write operations to the WORM device can be handled by a user process without involving the kernel. This strategy also simplifies on-line backup. Optical devices are becoming cheap and big enough to be used for backup. The backup device is placed at the lowest Z-stack level. Backup can then be done by means of the Z-Beam__down operation, and yet all files remain accessible on-line.

The present system can be employed to save disk space. All static files can be placed on inexpensive storage devices (e.g., CD-ROM) at the lower levels of the Z-stack. This allows the static files to remain available and frees hard disk space for other files.

Finally, the present system allows a potential customer to try a new software package without committing to installation that might alter the customer's system. Normally, customers are reluctant to installing trial software on their systems. However without installation, the software cannot be tested or evaluated on the customer's system. The present system permits trial software to be temporarily installed as the top level in a Z-stack, without modifying the customer's existing system in the underlying levels of the Z-stack. This process can be readily reversed to eliminate the trial software and return the customer's system to its original state.

The above disclosure sets forth a number of embodiments of the present invention. Other arrangements or embodiments, not precisely set forth, could be practiced under the teachings of the present invention and as set forth in the following claims.

I claim:

1. A file system for storing a plurality of directories containing files and directories having preselected names, said file system comprising:

means for creating a node for each of said files and directories, each directory node being linked to each file and directory node contained therein;

means for linking a plurality of said directory nodes having a common name in a selected order to create a stack, said stack having a top directory node;

means for searching said stack to find a specified name by sequentially searching said directory nodes in said stack beginning with said top directory node, and returning the node corresponding to the first occurrence of said name encountered in said search; and means for preventing access to any directory nodes in said stack having said specified name below said returned node.

2. The file system of claim 1, further comprising means for listing a union of all file and directory names contained in said directory nodes in said stack.

3. The file system of claim 1, further comprising means for designating one directory in said stack in which new files and directories may be created.

4. The file system of claim 1, further comprising means for copying all file and directory nodes contained in a first selected directory node in said stack to a second selected directory node in said stack.

5. The file system of claim 1, wherein said nodes further comprise means for designating one of a plurality of physical file storage systems.

6. A file system for storing a plurality of directories containing files and directories having preselected names, said file system comprising:

means for creating a node for each of said files and directories, each directory node being linked to each file and directory node contained therein;

means for linking a plurality of said directory nodes having a common name in a selected order to create a stack, said stack having a top directory node;

means for searching said stack to find a specified name by sequentially searching said directory nodes in said stack beginning with said top directory node, and returning the node corresponding to the first occurrence of said name encountered in said search; and means for copying all file and directory nodes contained in a first selected directory node in said stack to a second selected directory node in said stack.

7. The file system of claim 6, further comprising means for listing a union of all file and directory names contained in said directory nodes in said stack.

8. The file system of claim 6, wherein said nodes further comprise means for designating one of a plurality of physical file storage systems.

9. A file system for storing a plurality of directories containing files and directories having preselected names, said file system comprising:

means for creating a node for each of said files and directories, each directory node being linked to each file and directory node contained therein;

means for linking a plurality of said directory nodes having a common name in a selected order to create a stack, said stack having a top directory node;

means for searching said stack to find a specified file or directory name by sequentially searching said directory nodes in said stack beginning with said top directory node, and returning the node corresponding to the first occurrence of said name encountered in said search; and means for listing a union of all file and directory names contained in said directory nodes in said stack.

10. The file system of claim 9, wherein said nodes further comprise means for designating one of a plurality of physical file storage systems.

* * * * *